(12) United States Patent
Moriguchi et al.

(10) Patent No.: US 6,347,547 B1
(45) Date of Patent: Feb. 19, 2002

(54) METHOD OF MODIFYING UNIFORMITY OF A TIRE

(75) Inventors: Kinya Moriguchi; Toru Ishitsuka, both of Osaka (JP)

(73) Assignee: Toyo Tire & Rubber Co., Ltd., Osaka (JP)

(*) Notice: Subject to any disclaimer, the term of this patent is extended or adjusted under 35 U.S.C. 154(b) by 0 days.

(21) Appl. No.: 09/301,400

(22) Filed: Apr. 28, 1999

(30) Foreign Application Priority Data

Oct. 14, 1998 (JP) .......................... 10-292170

(51) Int. Cl.⁷ ............................. E01C 23/00
(52) U.S. Cl. ........................................ 73/146
(58) Field of Search ............... 73/146, 46, 462, 73/7, 8, 9, 1.82, 1.84, 586, 584, 460; 156/75; 152/154.1

(56) References Cited

U.S. PATENT DOCUMENTS

| | | | |
|---|---|---|---|
| 4,128,969 A | * 12/1978 | Gormish et al. ......... | 51/106 R |
| 4,856,324 A | * 8/1989 | Potts ........................... | 73/146 |
| 5,365,781 A | * 11/1994 | Rhyne ......................... | 73/146 |
| 5,639,962 A | * 6/1997 | Maloney ...................... | 73/146 |

FOREIGN PATENT DOCUMENTS

| | | |
|---|---|---|
| JP | 49-6601 | 1/1974 |
| JP | 56-53905 | 5/1981 |
| JP | 63-180507 | 7/1988 |
| JP | 6-229866 | 8/1994 |

* cited by examiner

Primary Examiner—Benjamin R. Fuller
Assistant Examiner—Abdullahi Aw-Musse
(74) Attorney, Agent, or Firm—Jordan and Hamburg LLP

(57) ABSTRACT

In order to reduce the second harmonic of tangential force variation (TFV) of tire constituting one of factors of vibration in high speed running of a vehicle, a tire is rotated at a vibration generating speed and phase and amplitude of the second harmonic of TFV are measured and mass members M are provided or eliminated at two locations opposed to each other in the diameter direction on a circumference of the tire such that the measured second harmonic of TFV is canceled by the second harmonic of TFV caused by providing or eliminating the masses.

3 Claims, 6 Drawing Sheets

THE SECOND HARMONIC OF TFV

THE SECOND HARMONIC OF TFV

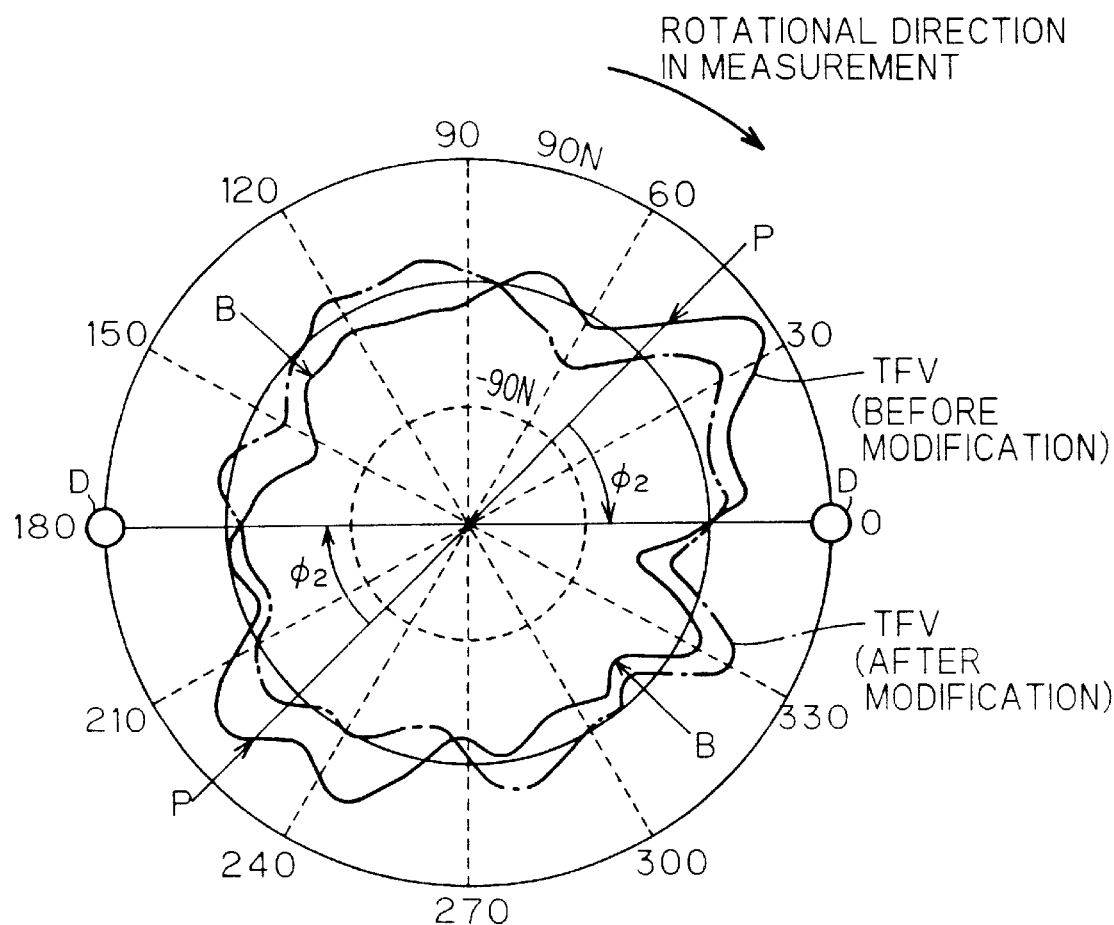

METHOD OF MODIFYING UNIFORMITY OF A TIRE

BACKGROUND OF THE INVENTION

1. Field of the Invention

The present invention relates to a method of modifying uniformity of tire, in details, to a method of reducing the second harmonic of TFV (tangential force variation) which is one of factors for causing vehicular vibration in high speed running of an automobile.

2. Description of the Related Art

Vehicular vibration such as vibration of a steering wheel caused in high speed running of an automobile, is caused by being inputted with force variation of tire owing to unevenness referred to as tire nonuniformity or force variation in centrifugal force caused by rotation of tire based on unevenness of mass of tire in its circumferential direction referred to as unbalance in correspondence with a vibration characteristic of suspension or the like of a vehicle. Among them, in respect of vibration of the first harmonic of tire rotation, there have been proposed a method concerning its mechanism and improvement.

For example, in respect of force variation caused by mass unbalance in the circumferential direction of tire, the variation is reduced by attaching a balance weight to a road wheel. Further, in respect of the first harmonic of TFV or radial force variation (RFV) caused by a variation in the diameter of tire, the variation is reduced by reducing force variation or diameter variation in the circumferential direction of tire.

Meanwhile, in respect of the second harmonic or higher harmonics, although they are normally small and not problematic, their levels are increased by an increase in the running speed of an automobile, further, they are considerably increased when the frequencies of the harmonics coincide with the resonance frequency of tire in high speed running.

Particularly, in respect of the second harmonic of TFV, a resonance frequency of a longitudinal torsional vibration of tire is at a vicinity of 25 through 40 Hz and accordingly, a frequency of the second harmonic of tire rotation and the longitudinal torsional resonance frequency coincide with each other at a vicinity of normal running speed of 100 km/h at high speed running, hence, the second harmonic of TFV increases significantly to thereby constitute a factor of generating vehicular vibration.

However, in respect of the second harmonic of TFV, its mechanism of occurrence and method of improvement thereof have not been clarified and even when a balance weight is attached to a road wheel similarly to reducing the force variation by unbalance, the second harmonic of TFV is not reduced.

Therefore, conventionally, a position of a seam of material is changed in producing tire or promoting accuracy of production steps, as a result, the second harmonic of TFV is reduced.

In view of such an actual situation, it is an object of the invention to reduce the second harmonic of TFV constituting one factor of vibration in high speed running of a vehicle.

SUMMARY OF THE INVENTION

As a result of an intensive study by ascribing the second harmonic of TFV to mass unbalance in the circumferential direction of tire and diameter variation in the circumferential direction, the inventors have found that the second harmonic of TFV is reduced by providing or eliminating masses at pertinent two locations opposed to each other in the diameter direction of tire and completed the invention.

That is, according to a first aspect of the invention, there is provided a method of modifying uniformity of tire wherein a tire is rotated at a vibration generating speed based on the second harmonic of TFV and a phase and an amplitude of the second harmonic are measured, and wherein the second harmonic of TFV is reduced by providing mass members specified based on the amplitude at two locations opposed to each other in a diameter direction of the tire specified based on the phase such that the measured second harmonic of TFV is canceled by the second harmonic of TFV caused by providing the masses.

More specifically, the measured phase of the second harmonic of TFV is converted into the first harmonic phase of the tire and the mass members are provided within a range of 32.0 through 61.0 deg in a rotational direction in measuring the second harmonic from tire positions minimizing the second harmonic by which the second harmonic of TFV can be reduced.

According to a second aspect of the invention, there is provided a method of modifying uniformity of tire wherein a tire is rotated at a vibration generating speed based on the second harmonic of TFV and a phase and an amplitude of the second harmonic are measured, and wherein the second harmonic of TFV is reduced by eliminating masses specified based on the amplitude at two locations opposed to each other in a diameter direction of the tire specified based on the phase such that the measured second harmonic of TFV is canceled by the second harmonic of TFV caused by eliminating the masses.

More specifically, the measured phase of the second harmonic of TFV is converted into the first harmonic phase of the tire and the specified masses are eliminated within a range of 32.0 through 61.0 deg in the rotational direction in measuring the second harmonic from tire positions maximizing the second harmonic by which the second harmonic of TFV can be reduced.

Next, a detailed description will be given of the operation of the invention.

In the case in which there causes mass unbalance in the circumferential direction of tire, as shown by FIG. 3, when the tire is rotated, unbalance force based on unbalanced mass m is caused by centrifugal force and TFV is caused by a component thereof TF in the longitudinal direction.

The longitudinal direction component TF of the centrifugal force of the unbalanced mass m is given as follows by acceleration $\alpha_Z$ in the diameter direction and acceleration $\alpha_X$ in the circumferential direction.

$$TF = m(\alpha_X \cos\theta + \alpha_Z \sin\theta) \tag{1}$$

In this case, the accelerations $\alpha_X$ and $\alpha_Z$ are measured by an inner face acceleration meter, changed in accordance with a position $\theta$ of the unbalanced mass m and is increased before and after grounding as shown by FIG. 4. This is because the substantial radius is changed when the unbalanced mass m is grounded. Owing to such a change of the accelerations $\alpha_X$ and $\alpha_Z$, even when there causes mass unbalance of the second harmonic at two locations (a state in which unbalanced masses are present at two locations opposed to each other in the diameter direction of tire), these are not canceled by each other.

Hence, as shown by FIG. 5, assume that unbalanced masses m are present at two locations opposed to each other in the diameter direction (phase=0 deg, 180 deg) on the circumference of the tire, TFV is calculated by calculating the longitudinal direction component TF of the centrifugal force of the unbalanced masses m by Equation (1) mentioned above and the result of calculation is subjected to Fourier analysis to thereby calculate the amplitude and the phase of the second harmonic of TFV. In that case, in respect of the magnitude of TF, magnitudes of respective frequency components are corrected in consideration of the transmissibility in the longitudinal direction of the tire.

The result is shown by FIG. 5 and in FIG. 5, the phase of the second harmonic of TFV is shown to be converted into the first harmonic phase of the tire. As shown by FIG. 5, according to the second harmonic of TFV, peak positions (positions having maximum values) P thereof are disposed at two locations opposed to each other in the diameter direction of 46.5 deg and 226.5 deg as tire positions and bottom positions (positions having minimum values) B are present at positions (136.5 deg and 316.5 deg) of a phase difference of 90 deg as tire positions from the peak positions P.

It is known thereby that according to the second harmonic of TFV caused by mass unbalance, the peak position P is provided with shift of phase of −93 deg from the position of the unbalanced mass m or rearward therefrom by 46.5 deg in a rotational direction in measuring the second harmonic as tire position. The fact signifies that by providing masses at two locations opposed to each other in the diameter direction of tire, there causes the second harmonic of TFV having peak positions rearward from positions of the masses by 46.5 deg as tire position and bottom positions forward therefrom by 43.5 deg.

In order to confirm the fact by an experiment, the second harmonic of TFV at a running speed of 100 km/h was measured by a high speed uniformity machine by using a radial tire for a passenger vehicle having a tire size of 175SR14.

In the experiment, from a waveform of the second harmonic of TFV in the case in which the second harmonic was measured by providing masses at two locations opposed to each other in the diameter direction of the tire, a waveform of the second harmonic of TFV in the case where the second harmonic of the tire was measured with the tire as it was, was subtracted by which a waveform which was changed by providing the masses was calculated and amplitude and phase thereof were calculated.

As a result, according to the second harmonic of TFV caused by providing the masses, the peak position was provided with shift of phase of about −100 deg from the position of the mass or rearward therefrom by about 50 deg in the rotational direction in measuring the second harmonic as the tire position and it was confirmed that a result equivalent to that of the above-described simulation was obtained.

A predetermined second harmonic of TFV can be caused by providing masses at two locations opposed to each other in the diameter direction of the tire in this way and accordingly, by aligning the bottom positions of the second harmonic of TFV caused by providing the masses to the peak positions of the second harmonic of TFV of the tire which have been calculated by the measurement, the second harmonic of TFV of the tire can be reduced.

In details, by providing mass members within a range of 46.5 deg±14.5 deg from the bottom positions of the measured second harmonic of TFV in the rotational direction in measuring the second harmonic as the tire position, the measured second harmonic of TFV of the tire is canceled by the second harmonic of TFV caused by providing the masses and as a result, the second harmonic of TFV of the tire can be reduced.

Meanwhile, the mass unbalance caused by the masses provided at two locations opposed to each other in the diameter direction as shown by FIG. 5, can be grasped as mass unbalance caused by deletion of masses d caused by eliminating the masses at positions with a phase difference 90 deg from the positions of providing the masses (90 deg, 270 deg) as shown by FIG. 6. Accordingly, it signifies that by eliminating masses at two locations opposed to each other in the diameter direction of tire, there causes the second harmonic of TFV having bottom positions B rearward from positions of eliminating the masses by 46.5 deg as a tire position and peak positions P forward therefrom by 43.5 deg.

By eliminating masses at two locations opposed to each other in the diameter direction of tire in this way, a predetermined second harmonic of TFV can be caused and accordingly, by aligning bottom positions of the second harmonic of TFV caused by eliminating masses to peak positions of the second harmonic of TFV of tire which has been calculated by measurement, the second harmonic of TFV of tire can be reduced.

In details, by eliminating masses within a range of 46.5 deg±14.5 deg in the rotational direction in measuring the second harmonic as tire position from peak positions of the measured second harmonic of TFV, the measured second harmonic of TFV of the tire is canceled by the second harmonic of TFV caused by eliminating the masses and as a result, the second harmonic of TFV of the tire can be reduced.

Further, although the second harmonic of TFV is caused not only by the mass unbalance in the circumferential direction of the tire but by diameter variation in the circumferential direction of the tire, the second harmonic of TFV can be reduced regardless of such factors of generating the second harmonic by providing or eliminating masses at two locations opposed to each other in the diameter direction as mentioned above.

BRIEF DESCRIPTION OF THE DRAWINGS

FIG. 8 is a graph showing actual waveforms at tire position of TFV before and after modifying the second harmonic of TFV in an example of a method according to the second embodiment.

DETAILED DESCRIPTION OF THE PREFERRED EMBODIMENTS

An explanation will be given of a method of modifying uniformity of tire according to a first embodiment of the invention in reference to FIGS. 1A and 1B.

Figure 1A:
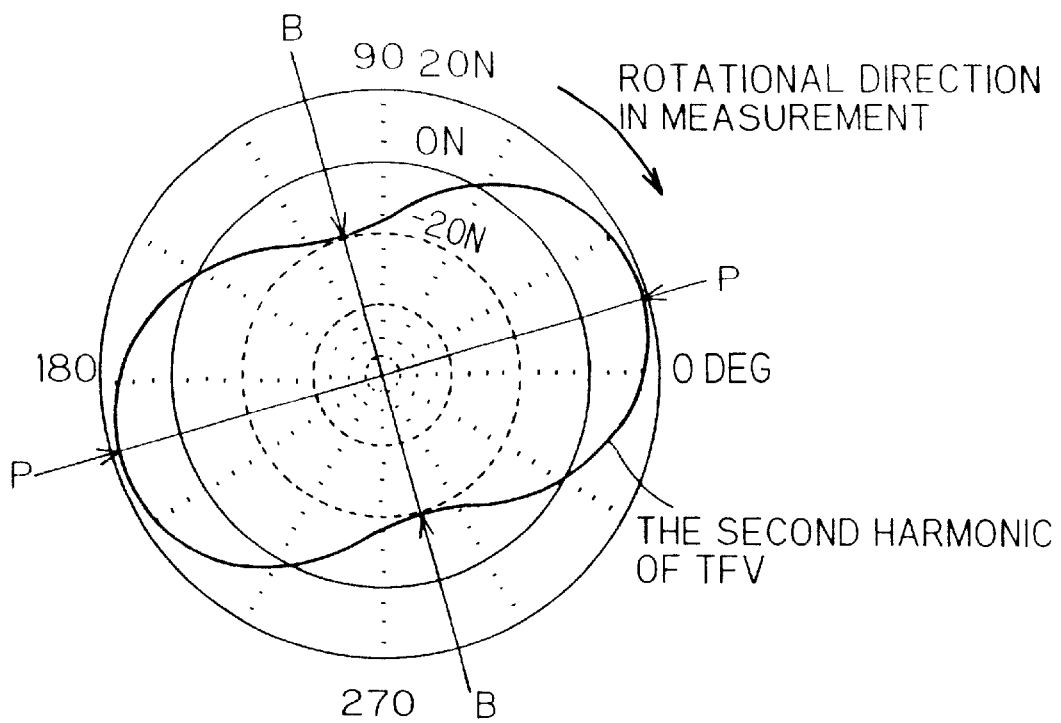
FIG. 1A is a graph showing a relationship between phase and amplitude of the second harmonic of TFV at tire position according to a first embodiment of the invention.

(1) First, amplitude and phase of the second harmonic of TFV are measured by rotating tire in the clockwise direction in view from paper face as shown by FIG. 1A by using a high speed uniformity machine.

The rotational speed in the measurement is set to a vibration generating speed based on the second harmonic of TFV. The vehicular vibration based on the second harmonic of TFV is increased when the frequency of the second harmonic of tire rotation and the longitudinal torsional resonance frequency of tire coincide with each other and accordingly, the vibration generating speed is a speed when the frequency of the second harmonic of tire rotation becomes near to the longitudinal torsional resonance frequency of tire.

(2) The phase of the second harmonic of TFV measured in the item (1) is converted into the phase of the first harmonic of tire and two locations of bottom positions thereof are specified.

For example, in this embodiment, assume that when the phase of the second harmonic of TFV is converted into the tire position, a waveform shown by FIG. 1A is provided. That is, assume a case in which the second harmonic of TFV is provided with a waveform in which the amplitude is 40 N and the phase is set such that peak positions P are at 15 deg and 205 deg and bottom positions B are at 105 deg and 285 deg relative to a predetermined reference position (phase=0 deg) in the circumferential direction of tire. Then, in this case, two locations of 105 deg and 285 deg opposed to each other in the diameter direction are specified as the bottom positions B.

(3) Mass members M are attached to tire at vicinities of 46.5 deg in the clockwise direction respectively from the two locations of the bottom positions B specified by the item (2).

Figure 1B:
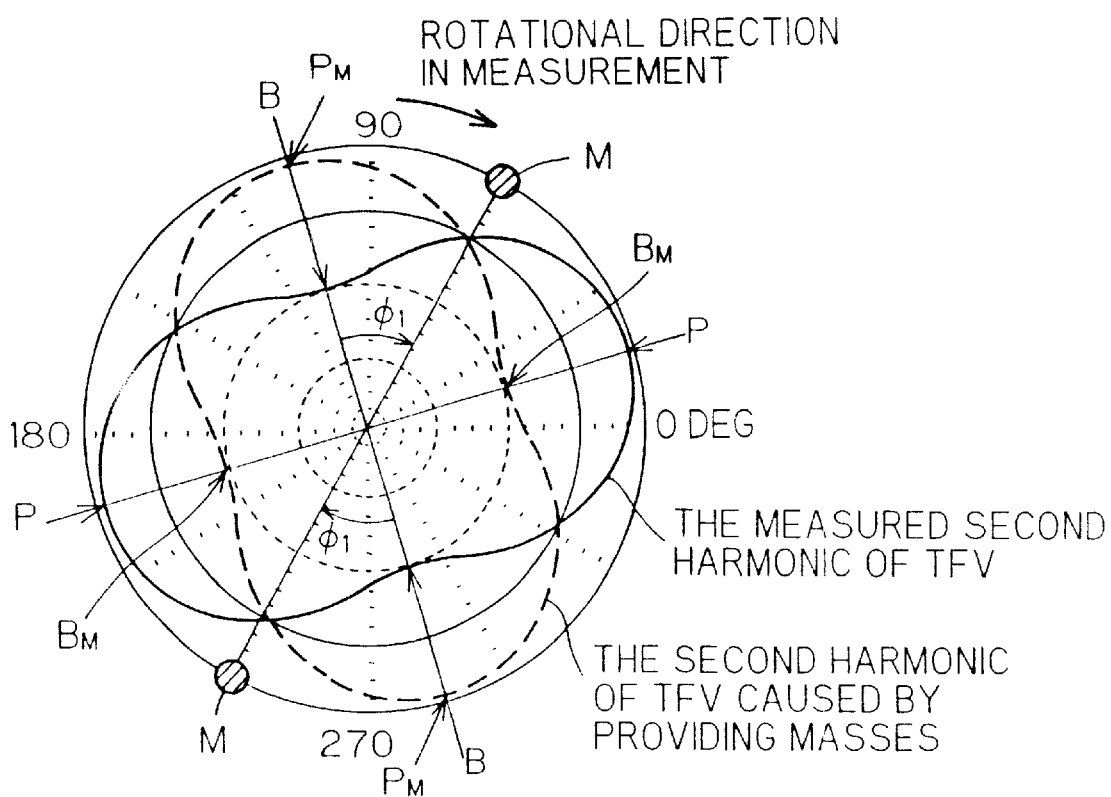
FIG. 1B is a graph adding positions of providing masses and a waveform of the second harmonic of TFV caused by the masses to FIG. 1A.

By providing the mass members M at the two locations opposed to each other in the diameter direction of tire in this way, as shown by FIG. 1B, the second harmonic of TFV having peak positions $P_M$ at the bottom positions B of the measured second harmonic of TFV and having bottom positions $B_M$ at the peak positions P of the measured second harmonic of TFV (designated by dotted line in the drawing). Therefore, the original second harmonic of TFV of tire is canceled and reduced by the second harmonic of TFV caused by providing the masses.

In this case, as the attached mass member M, an elastic body of rubber is used.

Further, the position in the circumferential direction of tire for attaching the mass member M is set in a range of $\phi1=32.0$ through 61.0 deg, further preferably, $\phi1=40.5$ through 52.5 deg in the clockwise direction from the bottom position. Although a maximum effect is achieved when the position of the mass member M is disposed at $\phi1=46.5$ deg in the clockwise direction from the bottom position B, even when phase shift of the second harmonic from 46.5 deg is 12 deg, an effect of 80% of the maximum effect is achieved and an effect of 50% of the maximum effect is achieved even when the phase shift is 29 deg. Accordingly, in order to achieve an effect of 50% or more of the maximum effect which is achieved by providing the mass member M, $\phi1$ may be $\phi1=46.5$ deg±14.5 deg. Further, in order to achieve an effect of 80% or more of the maximum effect, $\phi1$ may be $\phi1=46.5$ deg±6.0 deg.

Although the position in the diameter direction of tire for attaching the mass member M is not particularly restricted unless the outer diameter of tire is changed, it is preferable to set a position at a tire tread portion since significant effect is achieved with the same mass. More specifically, it is preferable to attach the mass member M at a groove bottom of the tread portion since the mass member M can be provided simply. Further, the mass member M may be attached on an inner side face of tire.

It is preferable to set the position in the width direction of tire for attaching the mass member M at a central portion in the width direction or on both sides in the width direction such that no influence is effected on other characteristics of tire.

The weight of the mass member M is determined based on the measured amplitude of TFV such that the amplitude of the second harmonic of TFV caused by the mass members M becomes equal to the measured amplitude of TFV. A relationship between the weight of the mass member M and the amplitude of the second harmonic of TFV caused thereby is varied by the diameter of tire and accordingly, in details, the relationship between the amplitude of the second harmonic of TFV and the weight of the mass member M is previously established in accordance with the tire size and the weight of the mass member M to be provided is specified from the measured amplitude of the second harmonic of TFV in accordance with the relationship.

Further, although in the above-described explanation, the bottom positions B of the second harmonic of TFV are specified in the item (2) and the mass members M are provided at the vicinities of 46.5 deg in the clockwise direction from the bottom positions B in the item (3), a similar result is obtained also when the peak positions P of the measured second harmonic of TFV are specified and the mass members M are provided at vicinities of 43.5 deg in the counter clockwise direction from the peak positions.

At this occasion, an explanation will be given of an example of actually reducing the second harmonic of TFV of tire by using a method according to the first embodiment.

Figure 7:
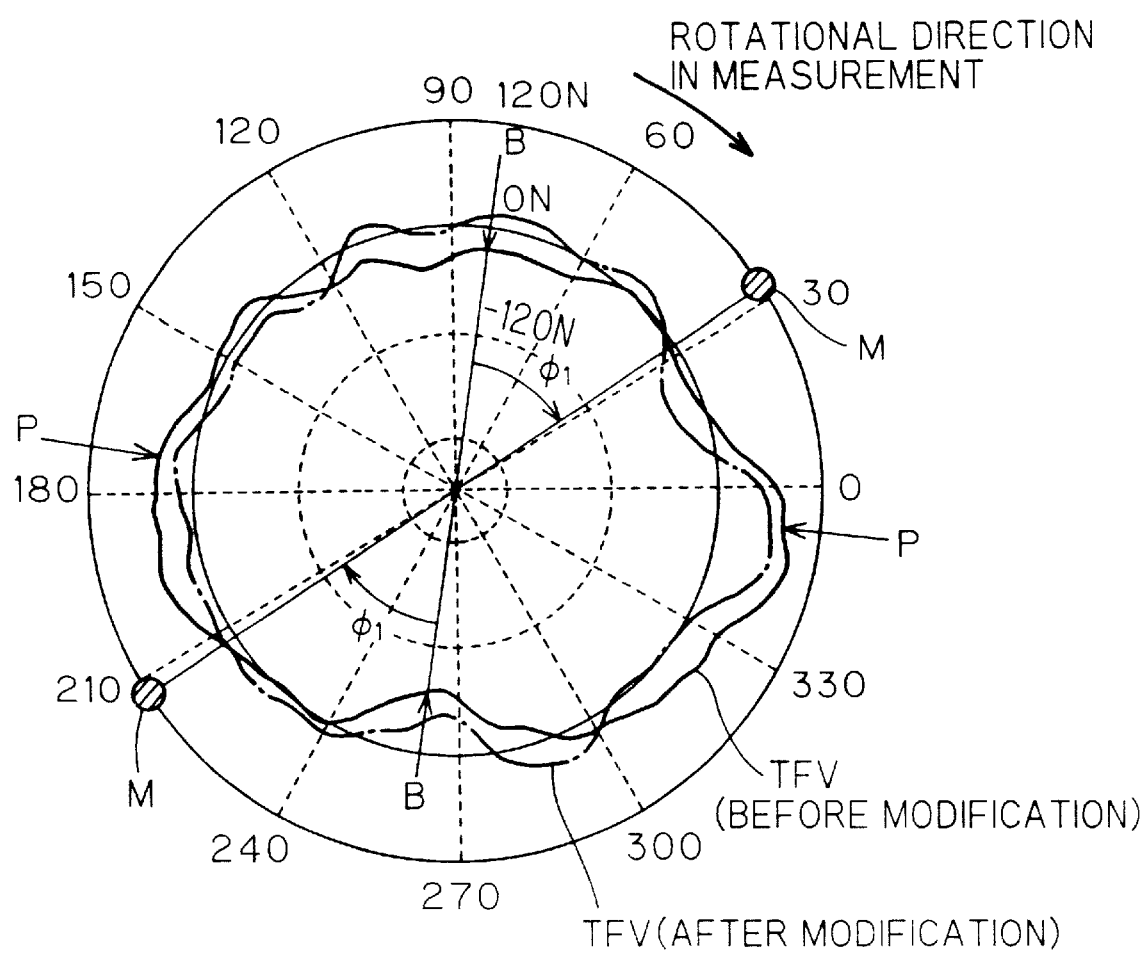
FIG. 7 is a graph showing actual waveforms at tire position of TFV before and after modifying the second harmonic of TFV in an example of a method according to the first embodiment.

A tire having a tire size of 175SR14 was integrated to a wheel of 14×5-J and was rotated at a running speed of 100 km/h under standard air pressure by using a high speed uniformity machine to thereby measure TFV. FIG. 7 shows an actual waveform of TFV as "TFV (before modification)". When the actual waveform was subjected to Fourier analysis and phase and amplitude of the second harmonic of TFV were calculated, in respect of the phase, as shown by FIG. 7, as tire position, peak positions P were disposed at 169.5 deg and 349.5 deg and bottom positions B were disposed at 79.5 deg and 259.5 deg relative to a predetermined reference position (0 deg) and the amplitude was 87 N. Hence, mass members M of 10 g were respectively provided at a vicinity of 33 deg and a vicinity of 213 deg both constituting $\phi1=46.5$ deg in the clockwise direction from the bottom positions B. Rubber was used as the mass member M which was attached to a groove bottom of a tread portion.

When tire provided with the mass members M was rotated at a speed the same as the above-described speed by using the high speed uniformity machine to thereby measure TFV, an actual waveform of TFV designated as "TFV (after modification)" in FIG. 7 was obtained. When the actual waveform was subjected to Fourier analysis and the amplitude of the second harmonic of TFV was calculated, the amplitude was 17 N and accordingly, the second harmonic of TFV was reduced by 70 N by providing the mass members M.

Next, an explanation will be given of a method of modifying uniformity of tire according to a second embodiment of the invention in reference to FIGS. 2A and 2B as follows.

(1) First, similar to the first embodiment, amplitude and phase of the second harmonic of TFV are measured.

(2) Next, the measured phase of the second harmonic of TFV is converted into the first harmonic phase as tire and two locations of peak positions are specified.

Figure 2A:
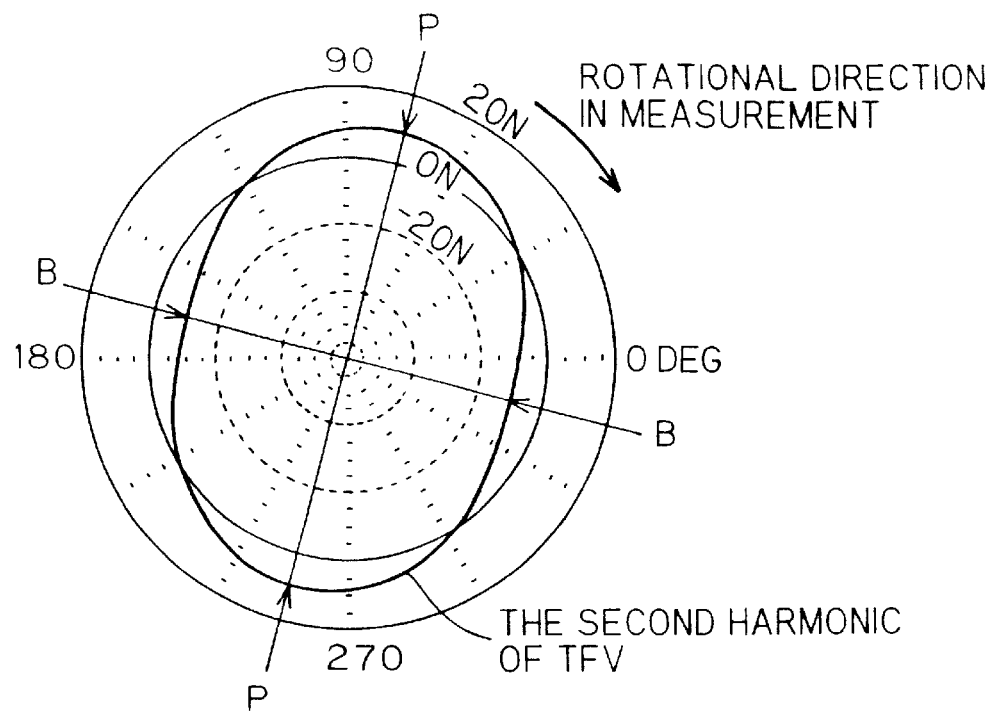
FIG. 2A is a graph showing a relationship between phase and amplitude of the second harmonic of TFV at tire position according to a second embodiment of the invention.

For example, in this embodiment, assume that when the phase of the second harmonic of TFV is converted into tire position, a waveform shown by FIG. 2A is provided. That is, assume that the second harmonic of TFV is provided with a waveform having peak positions P at 75 deg and 255 deg and bottom positions B at 165 deg and 345 deg relative to a predetermined reference position (phase=0 deg). Then, two locations at 75 deg and 255 deg opposed to each other in the diameter direction are specified as the peak positions P.

(3) Portions of tire are chipped off at vicinities of 46.5 deg in the clockwise direction respectively from the two locations of the peak positions P specified in the item (2) to thereby provide mass eliminating portions D at two locations opposed to each other in the diameter direction of tire.

Figure 2B:
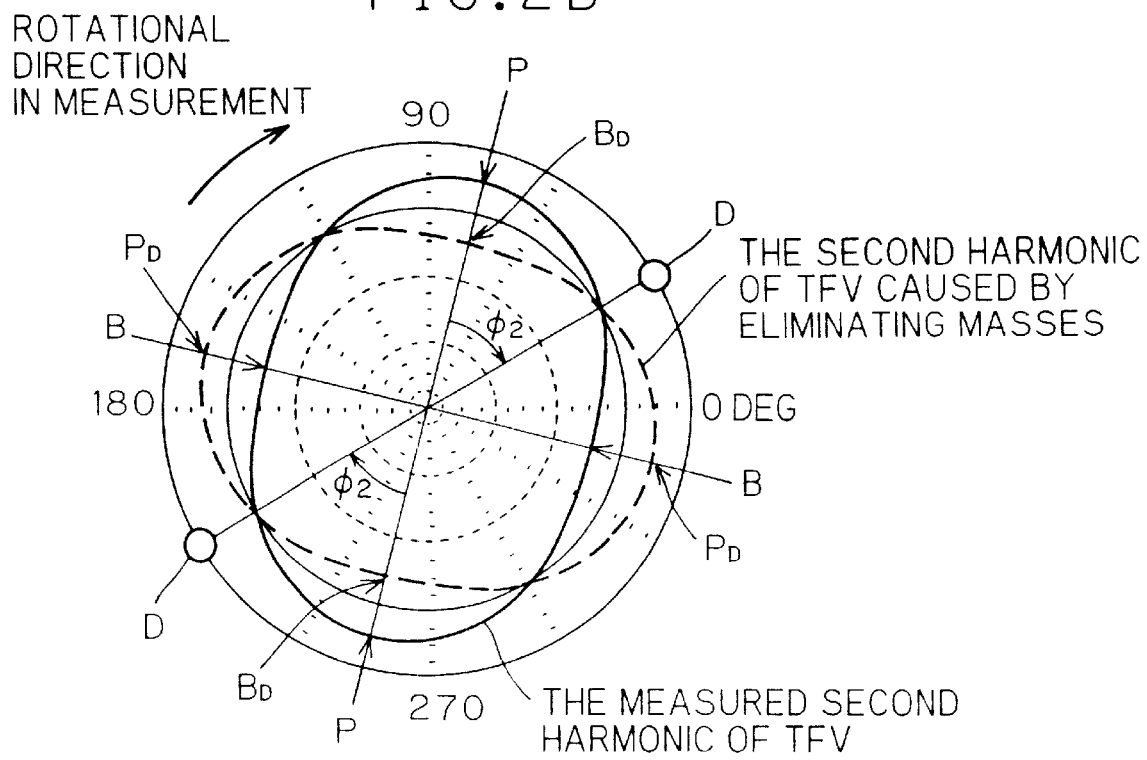
FIG. 2B is a graph adding positions of eliminating masses and a waveform of the second harmonic of TFV caused by the elimination to FIG. 2A.
Figure 3:
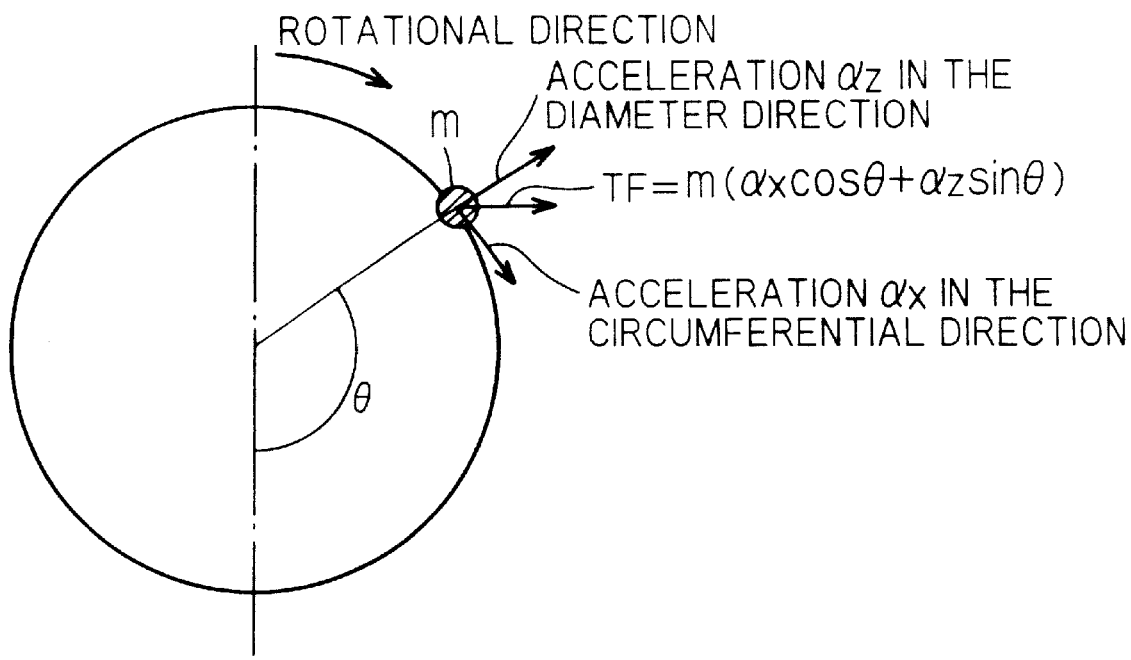
FIG. 3 is a diagram showing a force which is exerted when mass unbalance is caused in tire.
Figure 4:
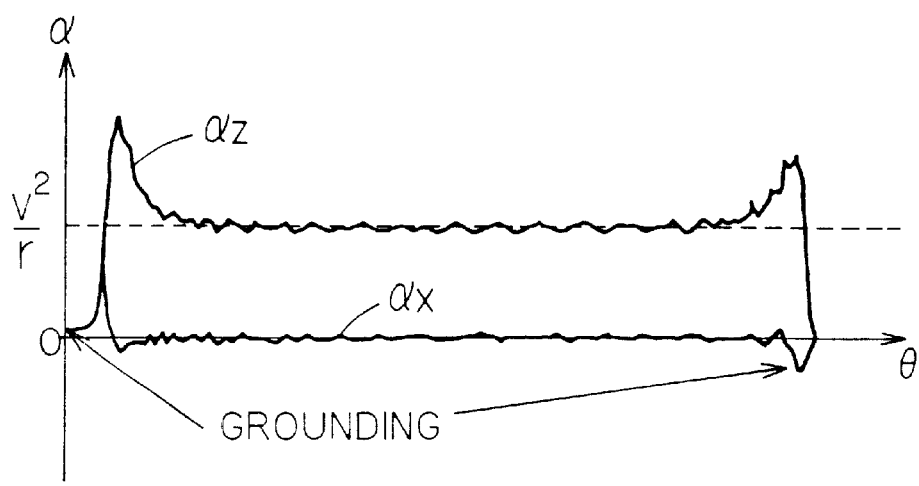
FIG. 4 is a graph showing a change in acceleration of an unbalanced mass.
Figure 5:
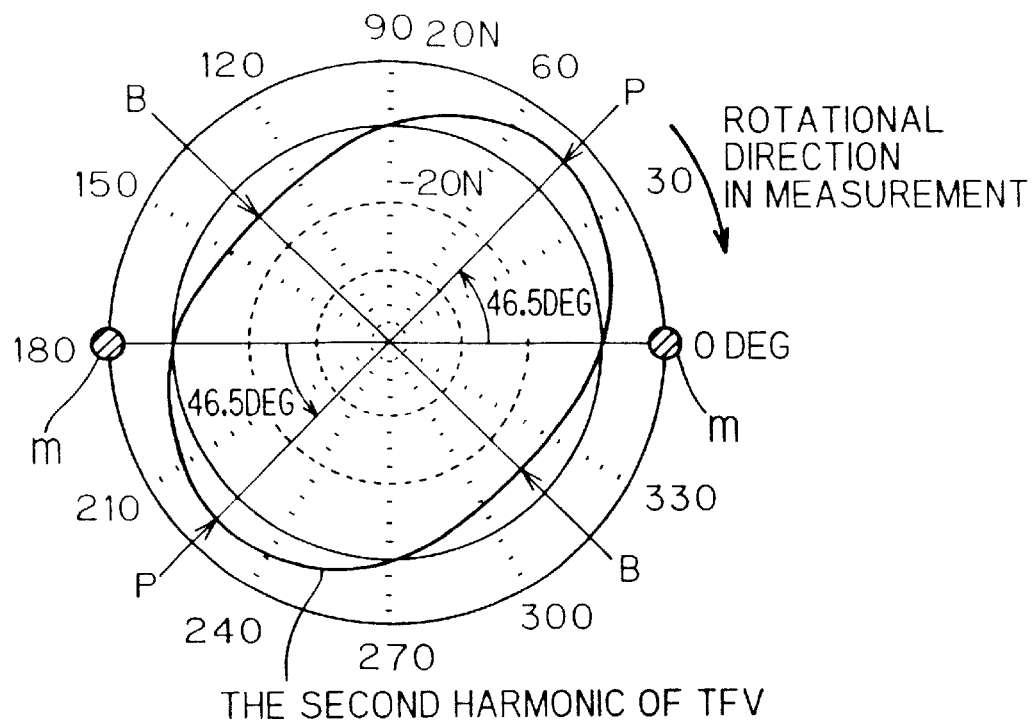
FIG. 5 is a graph showing a relationship between phase and amplitude of the second harmonic of TFV at tire position when mass unbalance is caused by providing masses on a circumference of tire.
Figure 6:
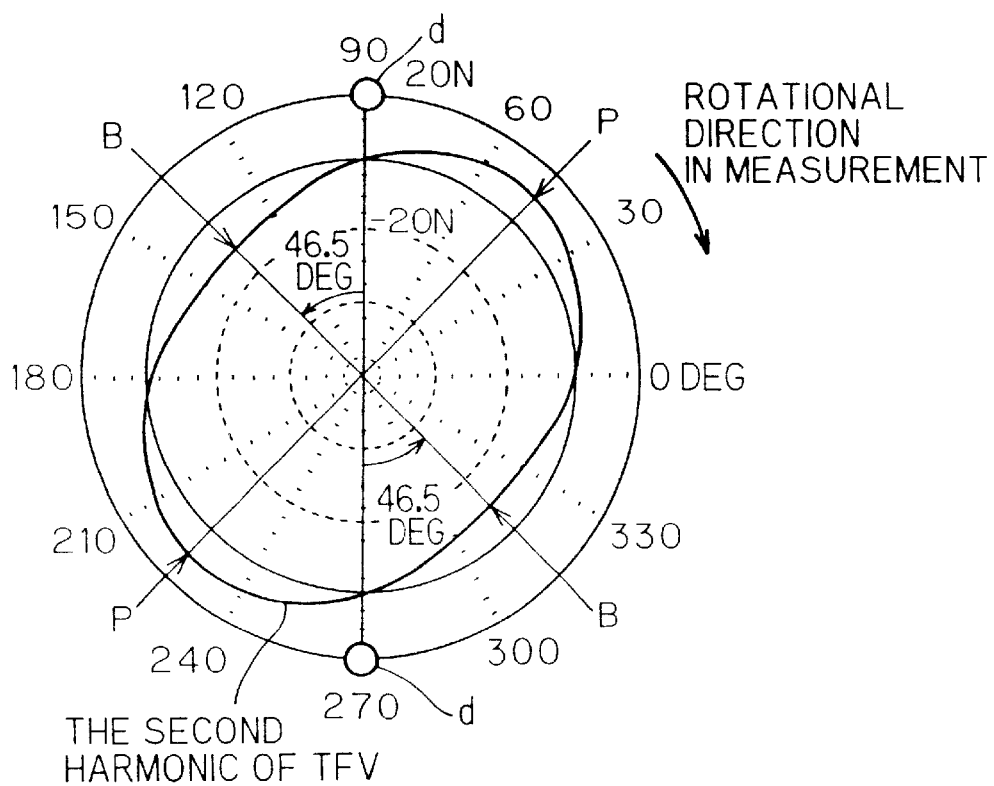
FIG. 6 is a graph showing a relationship between phase and amplitude of the second harmonic of TFV at tire position when mass unbalance is caused by eliminating masses on a circumference of tire.

By eliminating portions of tire at two locations opposed to each other in the tire diameter direction in this way, as shown by FIG. 2B, there is caused the second harmonic of TFV having bottom positions $B_D$ at the peak positions P of the measured second harmonic of TFV and having peak positions $P_D$ at the bottom positions B of the measured second harmonic of TFV (shown by a dotted line in the drawing). Therefore, the original second harmonic of TFV of tire is canceled to reduce by the second harmonic of TFV caused by the mass elimination.

In this case, the positions in the circumferential direction of tire of the mass eliminating portions D are set, in details, in a range of $\phi2=32.0$ through 61.0 deg, further preferably, $\phi2=40.5$ through 52.5 deg in the clockwise direction from the peak positions P. The reason is that similar to the case of providing the mass members M, to achieve an effect of 50% or more of a maximum effect provided in the case of $\phi2=46.5$ deg, it is requested that $\phi2=46.5$ deg±14.5 deg and to achieve an effect of 80% or more thereof, it is requested that $\phi2=46.5$ deg±6.0 deg.

Although the position of the mass eliminating portion D in the tire diameter direction is not particularly restricted unless the outer diameter of tire is changed, it is preferable to dispose the mass eliminating portion D at a tire tread portion since a significant effect is achieved with the same mass. More specifically, it is preferable to chip off a groove bottom of a tread portion or chip off a groove to widen the groove width since mass can simply be eliminated. Further, an inner side face of tire may be chipped off.

Further, it is preferable to dispose the position of the mass eliminating portion D in the tire width direction at a central portion in the width direction or positions thereof symmetrically on both sides in the width direction such that no influence is effected on other tire characteristics.

An amount of eliminating the mass eliminating portion D is determined based on the measured amplitude of TFV such that the amplitude of the second harmonic of TFV caused by the mass eliminating portions D becomes equal to the measured amplitude of TFV. In details, similar to the case of determining the weight of the mass member M according to the first embodiment, there is established a relationship between the amount of eliminating the mass eliminating portion D and the amplitude of the second harmonic of TFV previously in accordance with the tire size and the eliminated mass is specified from the measured amplitude of the second harmonic of TFV in accordance with the relationship.

Further, in the above-described, the bottom positions B of the measured second harmonic of TFV may be specified in the item (2) and the masses may be eliminated at vicinities of 43.5 deg in the counter clockwise direction from the bottom positions B.

At this occasion, an explanation will be given of the example of actually reducing the second harmonic of TFV of tire by using a method according to the second embodiment.

A tire having a tire size of 175SR14 was integrated to a wheel of 14×5-J and was rotated at a running speed of 100 km/h under standard air pressure by using a high speed uniformity machine to thereby measure TFV. FIG. 8 shows an actual waveform of TFV as "TFV (before modification)". When the actual waveform was subjected to Fourier analysis and phase and amplitude of the second harmonic of TFV were calculated, in respect of the phase, as shown by FIG. 8, as tire position, the peak positions P were disposed at 46.5 deg and 226.5 deg and the bottom positions B were disposed at 136.5 deg and 316.5 deg relative to a predetermined reference position (0 deg) and the amplitude was 64 N. Hence, masses D of 10 g were eliminated respectively at a vicinity of 0 deg and at a vicinity of 180 deg both constituting $\phi2=46.5$ deg in the clockwise direction from the peak positions P. The elimination of the masses D was carried out by chipping off the tread portions to widen the groove width of the tread portion.

When TFV was measured by rotating the tire in which the masses D have been eliminated at a speed the same as the above-described by using the high speed uniformity machine, an actual waveform of TFV designated as "TFV (after modification)" in FIG. 8 was obtained. When the actual waveform was subjected to Fourier analysis and the amplitude of the second harmonic of TFV was calculated, the amplitude was 10 N and accordingly, the second harmonic of TFV was reduced by 54 N by the elimination of the masses D.

As has been explained, according to the invention, by providing or eliminating masses at pertinent two locations opposed to each other in the diameter direction in tire, the second harmonic of TFV constituting one of factors of vibration in high speed running of a vehicle can be reduced.

What is claimed is:

1. A method of modifying uniformity of a tire comprising the steps of:
   measuring a phase and amplitude of a second harmonic of a tangential force variation of said tire;
   rotating the tire at a vibration generating speed based on the second harmonic of the tangential force variation; and
   providing mass members based on the measured phase and amplitude at two locations in the tire opposed to each other in a radial direction of the tire;
   wherein the measured second harmonic of the tangential force variation is reduced by the mass members.

2. The method of modifying uniformity of a tire according to claim 1, wherein measuring the phase of the second harmonic of the tangential force variation includes converting the second harmonic of the tangential force variation into a first harmonic phase of the tangential force variation of the tire and the mass members are provided within a range of 32.0° through 61.0° from a bottom position of the tire in a rotational direction thereby minimizing the second harmonic of the tangential force variation.

3. The method of modifying uniformity of a tire comprising the steps of:

measuring a phase and amplitude of a second harmonic of a tangential force variation of said tire;

rotating the tire at a vibration generating speed based on the second harmonic of the tangential force variation; and reducing the second harmonic of the tangential force variation by eliminating mass at two locations in the tire opposed to each other in the radial direction of the tire based on the measured phase and amplitude of the second harmonic of the tangential force variation, such that the measured second harmonic of the tangential force variation is reduced by eliminating the masses, wherein measuring the phase of the second harmonic of the tangential force variation includes converting the second harmonic of the tangential force variation into a first harmonic phase of the tangential force variation of the tire and the masses eliminated are within a range of 32.0° through 61.0° from a bottom position of the tire in a rotational direction thereby minimizing the second harmonic.

* * * * *